US008864184B2

(12) United States Patent
Thies et al.

(10) Patent No.: US 8,864,184 B2
(45) Date of Patent: Oct. 21, 2014

(54) BACKREST LID

(75) Inventors: Marcus Thies, Gevelsberg (DE); Andreas Irgang, Leichlingen (DE); Lars Lettenmayer, Neunkirchen-Seelscheid (DE); Michael Janzen, Köln (DE)

(73) Assignee: Johnson Controls GmbH, Burscheid (DE)

( * ) Notice: Subject to any disclaimer, the term of this patent is extended or adjusted under 35 U.S.C. 154(b) by 1876 days.

(21) Appl. No.: 11/629,602

(22) PCT Filed: Jun. 8, 2005

(86) PCT No.: PCT/EP2005/052636
§ 371 (c)(1),
(2), (4) Date: Oct. 10, 2008

(87) PCT Pub. No.: WO2006/063871
PCT Pub. Date: Jun. 22, 2006

(65) Prior Publication Data

US 2009/0134633 A1 May 28, 2009

(30) Foreign Application Priority Data

Jun. 16, 2004 (DE) ........................ 10 2004 028 846

(51) Int. Cl.
*E05C 9/10* (2006.01)

(52) U.S. Cl.
USPC ................................ 292/7; 292/300; 292/304

(58) Field of Classification Search
USPC ........................................ 292/7, 56, 300, 304
See application file for complete search history.

(56) References Cited

U.S. PATENT DOCUMENTS 3,679,259 A * 7/1972 Simonelli ................ 297/378.12
4,010,979 A * 3/1977 Fisher et al. ............. 297/378.11
4,143,913 A * 3/1979 Rumpf ..................... 297/378.11
4,365,837 A * 12/1982 Mizelle .................... 297/378.11
4,639,040 A 1/1987 Fujita et al.
4,707,010 A * 11/1987 Croft et al. ............... 297/378.11
4,733,912 A * 3/1988 Secord ..................... 297/378.11
5,425,568 A * 6/1995 Sliney et al. ............. 297/378.11
5,577,805 A * 11/1996 Glinter et al. ............ 297/378.12
2002/0125757 A1* 9/2002 LeTournoux ............ 297/378.12
2004/0036339 A1* 2/2004 Christoffel et al. ........... 297/367

FOREIGN PATENT DOCUMENTS

DE 29 41 235 A1 4/1981
DE 38 25 781 A1 2/1990
DE 41 06 973 A1 9/1992
DE 43 12 732 C1 12/1994
DE 197 56 344 A1 6/1999
DE 100 04 021 C1 6/2001
EP 0 774 376 B1 5/1997
EP 0 965 488 A1 12/1999
FR 2 828 149 A1 2/2003

OTHER PUBLICATIONS

International Search Report for PCT/EP2005/052636, date of mailing Jan. 13, 2006, 3 pages.

* cited by examiner

*Primary Examiner* — Mark Williams
(74) *Attorney, Agent, or Firm* — Foley & Lardner LLP

(57) ABSTRACT

A pivotable vehicle component is usable as a load or pass-through in a vehicle seat and include a pivotable latch which prevents the pivotable component from being unlatched from a force being applied by luggage (or other objects) during rapid decelerations such as in a crash.

9 Claims, 7 Drawing Sheets

18
13
14
17
18
13
14

BACKREST LID

CROSS-REFERENCE TO RELATED PATENT APPLICATIONS

This Application is a National Phase application of PCT/EP2005/052636 entitled, "VEHICLE COMPONENT AND METHOD FOR SECURING A PIVOTABLE COMPONENT AGAINST OPENING IN THE EVENT OF A CRASH" filed on Jun. 8, 2005 which published under PCT Article 21(2)2 on Jun. 22, 2006 as WO 2006/063871 A1 in the German language, which claims priority to German patent application DE102004028846.1 filed Jun. 16, 2004, the entire disclosures of which, including the specification and drawings, are expressly incorporated herein by reference.

BACKGROUND

The present disclosure relates to a vehicle component, preferably a backrest of a seat, which includes a pivotable component, preferably a through-load hatch with a lock.

To increase the loading volume, the passenger compartment and the luggage compartment in vehicles are frequently separated by pivotable walls, seats or by through-load hatches, so that the passenger compartment may be used at least partially as a luggage compartment. Through-load hatches, in particular, have the advantage that long objects such as skis may be loaded into a passenger vehicle without a seat having to be folded down. To help ensure that, in the event of an accident, at least when walls, seats or through-load hatches are folded up, no luggage penetrates the passenger compartment or the through-load hatch does not spring open, it is best to ensure that the through-load hatches do not open by means of the forces acting on the walls, seats or the through-load hatch.

Thus, it would be desirable to provide an inexpensive vehicle component which may be easily produced and assembled, which does not open in the event of an accident.

SUMMARY

In one embodiment, a vehicle component includes a pivotable component with a lock, the lock comprising a detent hook which, when operational, may be rotated about a first rotational axis from a locked position into an unlocked position, the unlocked pivotable component being able to be folded about a second rotational axis in an opening direction from a substantially vertical resting position into a substantially horizontal loading position, the first rotational axis being displaced in relation to the pivotable component and/or the detent hook being displaced in relation to the first rotational axis from an operating position into a crash position, when the pivotable component is in the locked resting position and by means of a force acting in the opening direction of the pivotable component, so that the detent hook preferably cooperates in a reversible manner with the pivotable component such that said component may not be unlocked.

The displacement of the rotational axis, according to one exemplary embodiment, in relation to the pivotable component and/or the displacement of the detent hook in relation to the rotational axis, ensures that the pivotable component may not be unlocked and therefore no luggage is able to penetrate the passenger compartment by means of the pivotable component, when the pivotable component is located in the locked resting position. In one embodiment, the detent hook cooperates in a reversible manner with the pivotable component in the event of an unintended incident such that the component is not able to be unlocked, which allows the vehicle component to be reused without repair costs, if the vehicle component has not been damaged during the incident.

According to one embodiment, the first rotational axis may be displaced in relation to the pivotable component, and/or the detent hook may be displaced in relation to the first rotational axis, from an operating position into a crash position. Preferably, one of the pivotable component and the detent hook may comprise a recess, preferably a slot, particularly preferably an elongated hole, by means of which the first rotational axis may be displaced in a controlled manner in relation to the pivotable component and/or the detent hook may be displaced in a controlled manner in relation to the first rotational axis. The recess guides the rotational axis and/or the detent hook in the event of a crash into the preferred crash position, so that it is no longer possible to unlock the pivotable component.

In one exemplary embodiment, the lock comprises a locking part which is fixedly connected to the vehicle component, the detent hook, when operational and in the resting position of the pivotable component, cooperating with the locking part and preventing folding of the pivotable component and the pivotable component being able to be unlocked by rotating the detent hook about the first rotational axis and about the locking part. The cooperation of the locking part with the detent hook locks the pivotable component, when operational, in a simple and secure manner.

Preferably, in the event of an unintended incident, and in the locked resting position of the pivotable component, the detent hook acts non-positively between the locking part and the pivotable component and transmits the force acting in the event of a crash in the opening direction of the pivotable component onto the locking part. Due to the non-positive connection of the detent hook with the locking part and the pivotable component and the arrangement between the locking part and the pivotable component, the forces occurring in the event of a crash are directed into the structure of the vehicle component and thus do not act on the vehicle passengers, at least not fully.

In one exemplary embodiment, the detent hook comprises a detent means, preferably a nose, which cooperates with the pivotable component and, in the event of a crash and in the locked resting position of the pivotable component, prevents the unlocking of the detent hook. A detent is any means which secures the position of a component and prevents an alteration of the position. The detent means secures against the unlocking of the pivotable component by preventing, in the event of an unintended incident, the alteration of the position of the detent hook. The detent means may, in the event of an incident, plastically and/or elastically deform and therefore also possibly act in a locking manner.

In a one embodiment, the lock comprises an unlocking lever which, when operational, may be rotated about the first rotational axis and by the rotation of which the detent hook may be rotated from the locked position into the unlocked position. Easy operation of the pivotable component is possible using the unlocking lever.

In one embodiment, the lock comprises a spring or biasing means, preferably a spring, which holds the first rotational axis and/or the detent hook in the operating position and preferably, after the incident, transfers the first rotational axis and/or the detent hook into the operating position again. The spring means increases the operational reliability of the lock and by the preferred transfer of the detent hook from the crash position into the operating position after a crash, preferably due to the return force of the spring, allows the first rotational axis and/or the detent hook to be transferred again into the operating position, so that the reuse of the vehicle component is possible without repair costs, if the vehicle component has not been damaged during the crash. The spring means may additionally serve always to return the unlocking lever into its locked position. Preferably, in the event of a crash, the first rotational axis is displaced in relation to the pivotable component and/or the detent hook is displaced in relation to the first rotational axis against the force of the spring means. It is thereby ensured that the pivotable component has not already been prevented from being unlocked by forces occurring when operational, but that a minimum force is required therefor, which preferably does not occur when operational. The spring means may also be a means which is plastically deformed in the event of a crash.

Preferably, in one embodiment, at least the unlocking lever and the detent hook of the lock are produced in one piece. As a result, the number of components is small and the lock may be produced and assembled inexpensively and easily. Preferably, the pivotable component and/or the lock are produced from plastic which is inexpensive and, as a result of which, the vehicle component has a low weight.

The vehicle component ensures that, in the event of a crash, no luggage is able to penetrate from the luggage compartment into the passenger compartment, by means of a pivotable component of the vehicle component, if the pivotable component is in the locked resting state before the crash. The lock of the pivotable component may be produced and assembled easily and inexpensively and the vehicle component has a low weight. Preferably, the pivotable component may be reused without repair costs, after a crash, if the vehicle component has not been damaged during the crash. The pivotable component is able to be easily operated by a passenger.

In one exemplary embodiment, a method for securing a pivotable component against opening in the event of a crash, which may be locked by means of a lock which comprises a detent hook which, when operational, may be rotated about a first rotational axis from a locked position into an unlocked position, the unlocked pivotable component being able to be folded about a second rotational axis in an opening direction from a substantially vertical resting position into a substantially horizontal loading position, the first rotational axis, in the event of an unintended incident in the locked resting position of the pivotable component, being displaced in a reversible manner by a force acting in the opening direction of the pivotable component, preferably such that the pivotable component may not be unlocked. The method may be carried out in a simple manner.

BRIEF DESCRIPTION OF THE DRAWINGS

A vehicle component is explained below by reference to FIGS. 1-6*b*. The explanations are merely exemplary.

DETAILED DESCRIPTION

Figure 1:
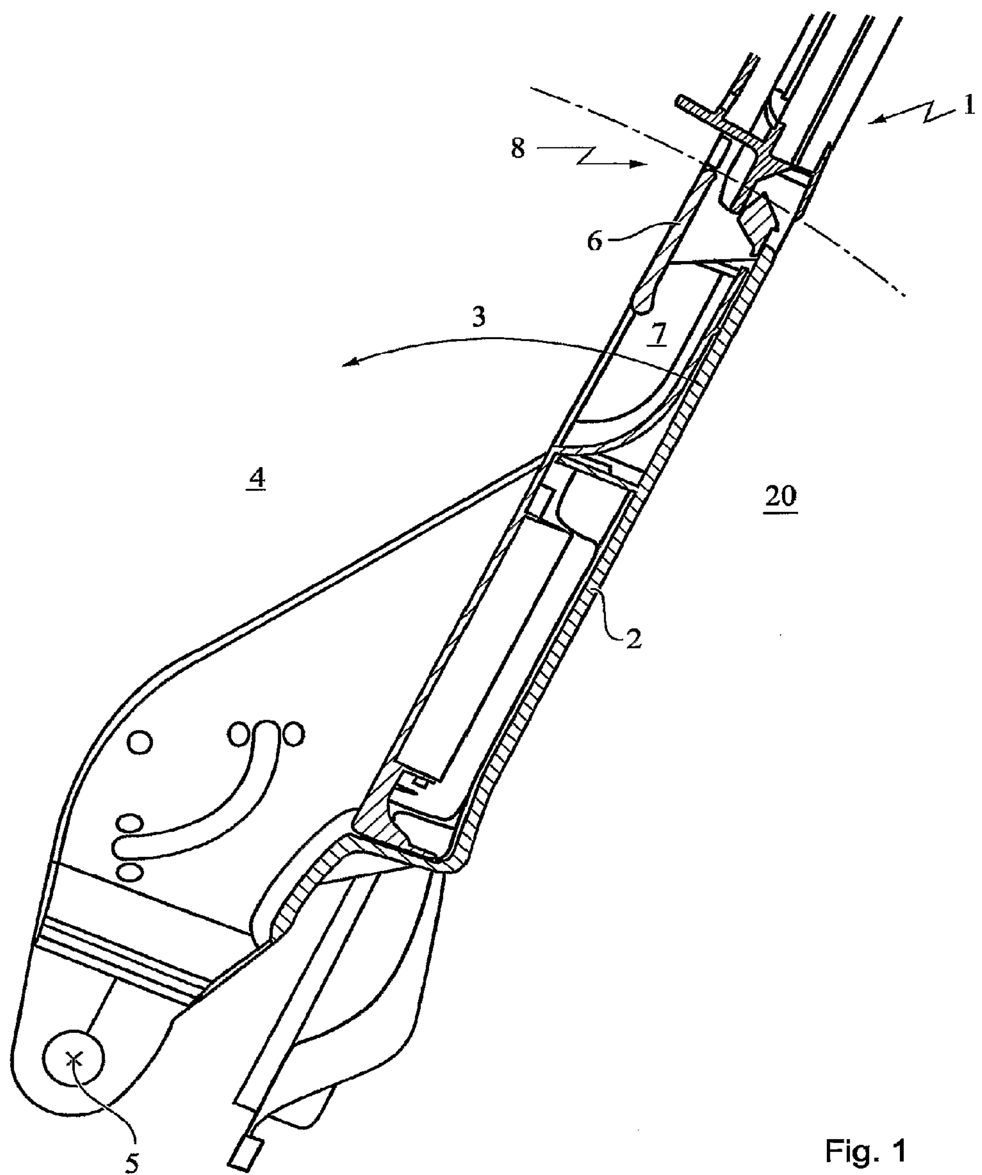
FIG. 1 shows a vertical cross-section through a vehicle component, in this case through a backrest of a seat.
Figure 2:
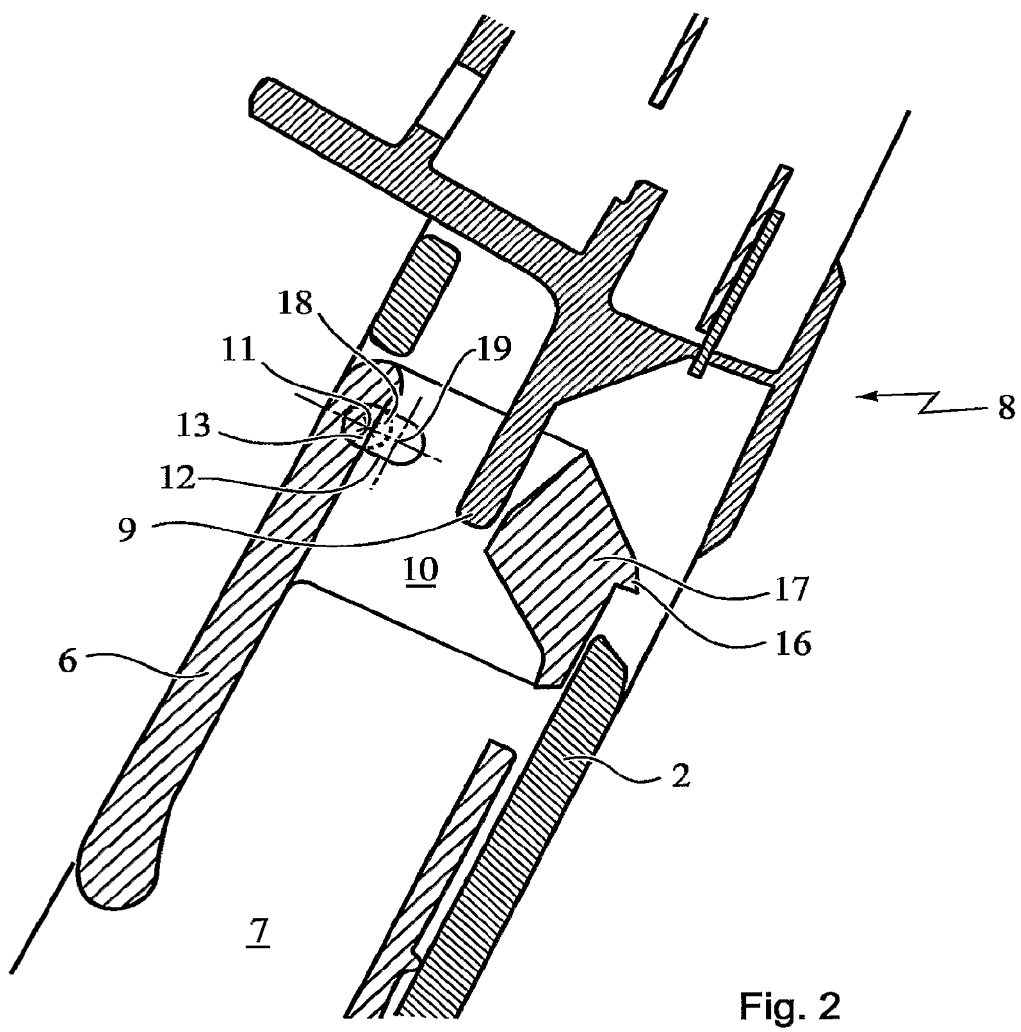
FIG. 2 shows a vertical cross-section of a lock of a pivotable component, in this case of a through-load hatch, of the vehicle component of FIG. 1.

Referring to FIGS. 1-6*b* and, in particular to FIG. 1, a vehicle component 1, in this case a backrest of a seat is shown. The term “backrest” is, therefore, used hereinafter for the vehicle component 1. The backrest 1 separates a passenger compartment 4 from a luggage compartment 20 and comprises a pivotable component 2, in this case a through-load hatch, for example, for skis and other lengthy items. The term “hatch” is, therefore, used hereinafter for the pivotable component 2. When operational, the hatch 2 is able to be folded in a reversible manner from a substantially vertical resting position, shown in FIG. 1, to a substantially horizontal loading position about a second rotational axis 5 in an opening direction, which is shown by the arrow 3. The through-load hatch 2 may be locked in a reversible manner to the backrest 1, by means of a lock 8, in the resting position. The locking and/or unlocking of the lock 8 is carried out by the unlocking lever 6 which, when operational, may be rotated about a first rotational axis 11 which is shown in FIG. 2, whereby the hatch 2 may be unlocked into an unlocked position. In the sense of the explanations, the term, “when operational” means the normal use situation of the vehicle in contrast to an unintended incident, accident or crash situation. For easier handling of the unlocking lever 6 the hatch comprises a recessed grip 7.

FIG. 2 shows the lock 8 of the through-load hatch 2 of FIG. 1 in a vertical cross-section. The hatch 2, which comprises the recessed grip 7 for easier handling of the unlocking lever 6, is shown. The unlocking lever 6 may be rotated about a first rotational axis 11. FIG. 2 shows the lock 8 when operational in the locked position. The first rotational axis 11 is in the operating position 18. A recess 12 is also visible, in this case an elongated hole, in which, in the event of a crash, in the embodiment shown in FIG. 2, the first rotational axis 11 is displaced in relation to the hatch 2 into a crash position 19. The first rotational axis 11 is formed in this case by a pin 13. When rotating the unlocking lever 6 about the first rotational axis 11, the detent hook 17 which, in this embodiment of the vehicle component 1, is integral with the unlocking lever 6, is rotated about the first rotational axis 11 and about a locking part 9. The locking part 9 is arranged in a receiver 10 for the locking part 9. The detent hook 17 is arranged in the locked position between the locking part 9 and the hatch 2 and is rotated, when rotating about the first rotational axis 11, about the locking part 9, so that the hatch 2 is unlocked. For securing in the event of a crash, the detent hook 17 comprises a detent means 16, in this case a nose.

Figure 3:
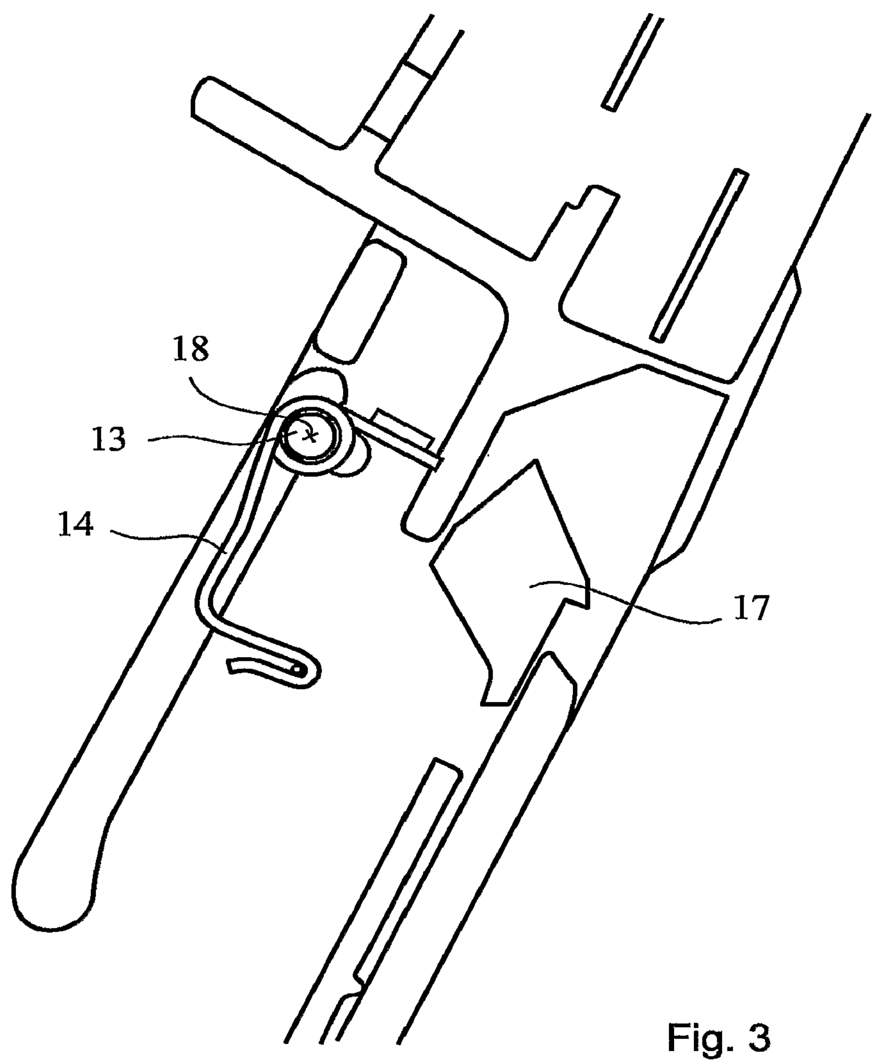
FIG. 3 shows the lock of FIG. 2 in a locked position when operational.

FIG. 3 shows the lock 8 of FIG. 2 in the locked position when operational. The detent hook 17 and/or the first rotational axis 11 and/or the pin 13, which in this embodiment forms the first rotational axis 11, are held in the operating position 18 by a spring or biasing means 14, in this case a spring. The term “spring” is used hereinafter for the biasing means 14. Additionally, the unlocking lever 6 is held by the spring 14 in the locked position shown.

Figure 4:
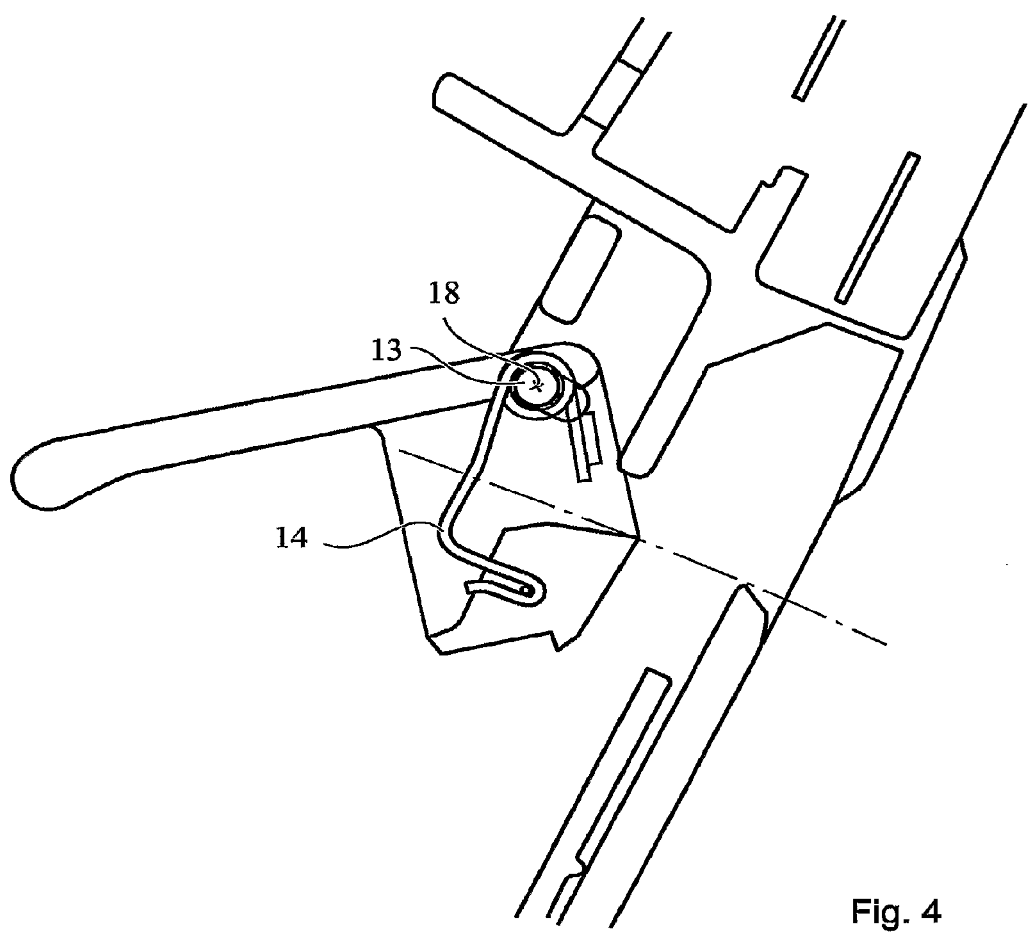
FIG. 4 shows the lock of FIG. 2 in a unlocked position when operational.

FIG. 4 shows the lock 8 of FIG. 2 in the unlocked position when operational. By rotating the unlocking lever 6 against the force of the spring 14 and, as a result, the detent hook 17 about the first rotational axis 11 and/or the pin 13, the hatch 2 is unlocked, the pin 13 remaining in the operating position 18. As the rotational axis 11 is in the operating position, the detent nose may be rotated past the hatch 2. The spring 14 is tensioned during the unlocking and preferably moves the detent hook 17 into the locked position.

Figure 5:
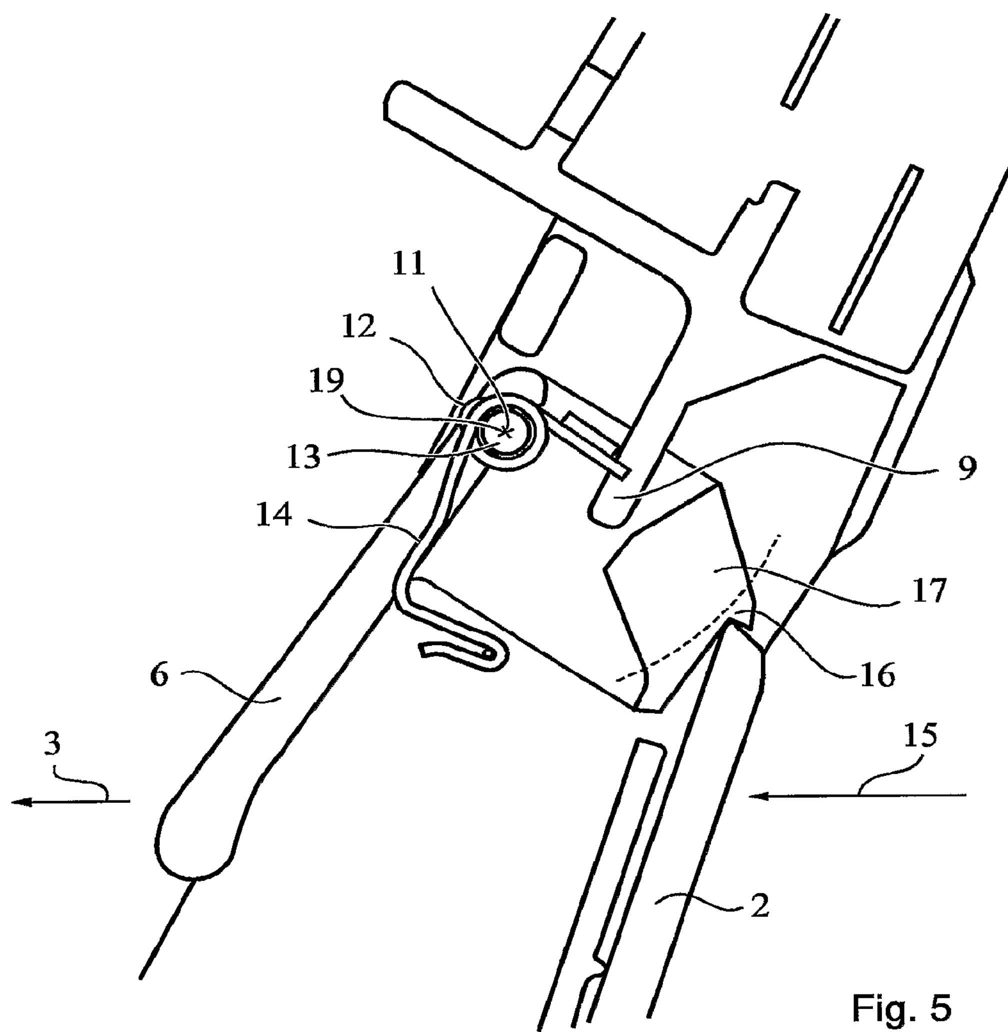
FIG. 5 shows the lock of FIG. 2 in the locked position in the event of a crash.

FIG. 5 shows the lock 8 of FIG. 2 in the locked position in the event of a crash. By means of a force 15 in the opening direction 3 of the hatch 2, in this embodiment the first rotational axis 11 and/or the pin 13 is displaced to the right in the recess 12 in relation to the hatch 2 into the crash position 19. As a result, the detent hook 17 may no longer rotate past the hatch 2 into the unlocked position. The detent hook 17 acts non-positively between the fixedly arranged locking part 9 and the hatch 2, and directs the occurring forces into the structure of the seat. Additionally, the detent hook 17 comprises a detent means 16, in this case a nose which, in the event of a crash, at least partially bears against the hatch 2 and prevents the unlocking of the detent hook 17. The first rotational axis 11 is displaced against the force of the spring 14 and, after the crash, is transferred into the operating position 18 again, due to the return force of the spring 14.

Figure 6B:
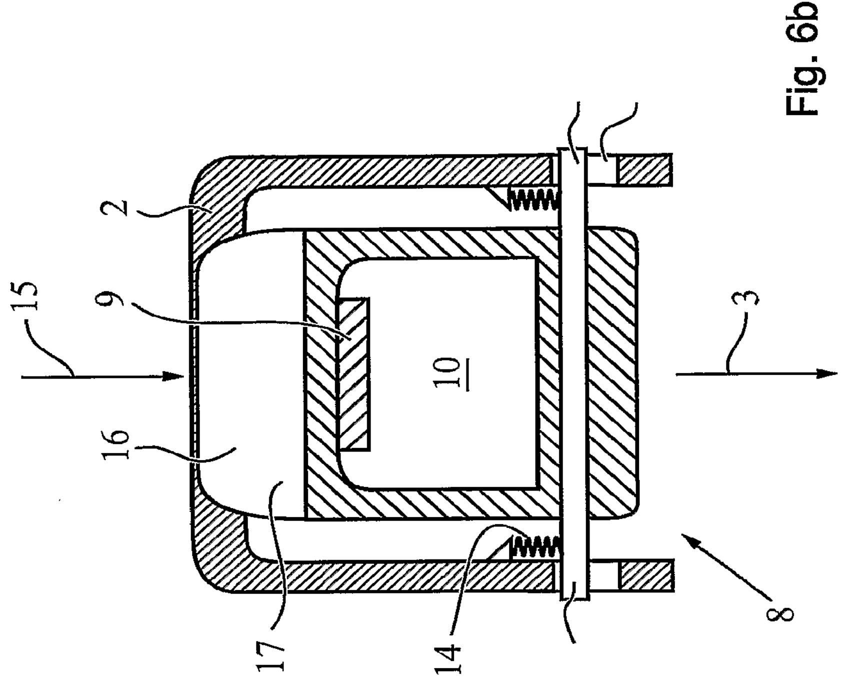
FIG. 6*b* shows the pivotable component 2 with the lock of FIG. 2 in a horizontal cross-section in the locked position in the event of a crash.
Figure 6A:
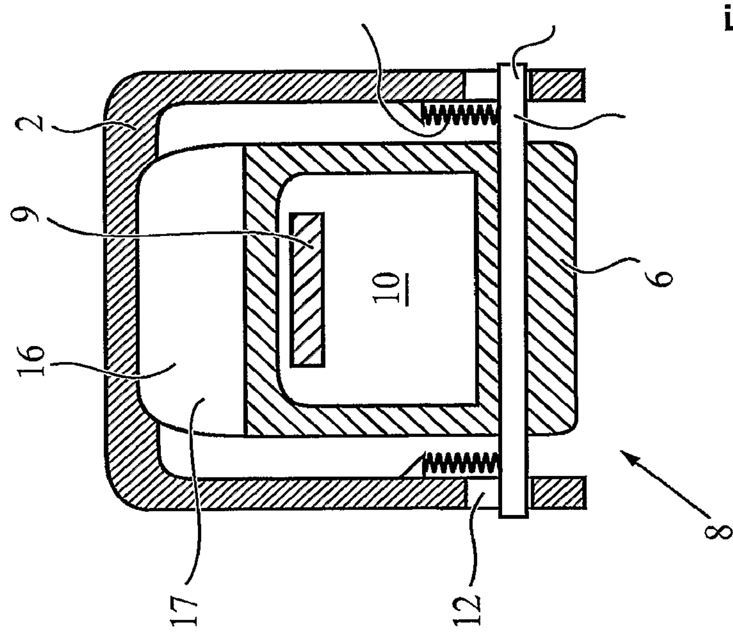
FIG. 6*a* shows the pivotable component with the lock of FIG. 2 in a horizontal cross-section in the locked position, when operational.
Figure 7:
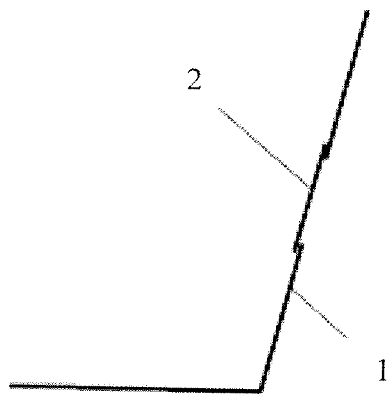
FIG. 7 shows a backrest of a vehicle seat including a pivotable component configured in a substantially vertical resting position.
Figure 8:
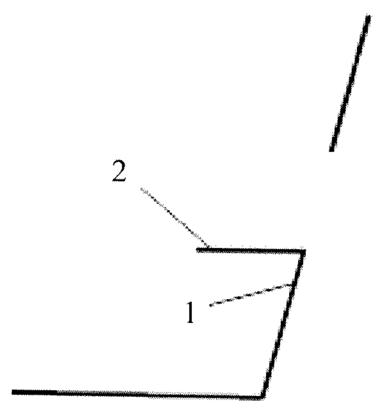
FIG. 8 shows the backrest of FIG. 7 with the pivotable component configure in a substantially horizontal loading position.

FIG. 6*a* shows the hatch 2 with the lock 8 of FIG. 2 in a horizontal cross-section in the locked position when operational. The unlocking lever 6 and the detent hook 17 are integral with the detent means 16 and may be rotated about the pin 13 which forms the first rotational axis 11. The pin 13 is held in two recesses 12 of the hatch 2 in the operating position 18 by two springs 14. The locking part 9 is arranged in the receiver 10 for the locking part 9, so that the detent hook 17 is arranged between the locking part 9 and the hatch 2 and the hatch 2 is locked.

FIG. 6*b* shows the hatch 2 with the lock 8 of FIG. 2 in a horizontal cross-section in the locked position in the event of a crash. By means of a force 15 acting on the hatch 2 in the opening direction 3 of the hatch 2, the pin 13 is displaced in the recesses 12 against the force of the springs 14 into the crash position 19. In this position, the detent hook 17 is arranged non-positively between the locking means 9 and the hatch 2 and the detent nose 16 prevents the unlocking of the detent hook 17.

The invention claimed is:

1. A through load hatch for a backrest of a vehicle seat, the through load hatch comprising:

a pivotable component including an elongated recess; and a lock having a detent hook with a portion disposed in the recess to engage the pivotable component such that the detent hook can rotate about a first rotational axis relative to the pivotable component from a locked position into an unlocked position, the portion being configured to slide in the recess in the pivotable component such that the first rotational axis moves relative to the pivotable component;

wherein the recess in the pivotable component is configured to guide the lock to control movement of the first rotational axis relative to the pivotable component;

wherein, when the detent hook is in the unlocked position, the pivotable component can be folded about a second rotational axis in an opening direction from a substantially vertical resting position and a substantially horizontal loading position;

wherein, when the detent hook is in the locked position, the pivotable component cannot be folded about the second rotational axis in the opening direction from the substantially vertical resting position into the substantially horizontal loading position;

wherein, when the detent hook is in the locked position, the pivotable component is configured to be displaced in relation to the first rotational axis from an operating position into a crash position by a force acting in the opening direction of the pivotable component to cause the detent hook and the pivotable component to cooperate to secure the detent hook in the locked position and thereby secure the pivotable component in the substantially vertical resting position, and upon release of the force in the opening direction the detent hook is rotatable to the unlocked position to allow rotation of the pivotable component to the substantially horizontal loading position;

further comprising a locking part, and wherein when the detent hook is in the locked position the detent hook cooperates with the locking part to prevent folding of the pivotable component from the resting position until the detent hook is rotated to the unlocked position about the first rotational axis and about the locking part; and wherein when the detent hook is in the locked position and the pivotable component is in the resting position, the force acting on the pivotable component in the opening direction of the pivotable component is transmitted from the pivotable component to the locking part through the detent hook.

2. The through load hatch as claimed in claim 1, wherein the detent hook comprises a nose configured to engage the pivotable component when the force acts on the pivotable component in the opening direction during to prevent the unlocking of the lock.

3. The through load hatch as claimed in claim 1, wherein the lock further comprises an unlocking lever operatively coupled to the detent hook and configured to rotate about the first rotational axis to rotate the detent hook between the locked position and the unlocked position.

4. The through load hatch as claimed in claim 1, further comprising a biasing member configured to bias the first rotational axis and the detent hook toward the operating position.

5. The through load hatch as claimed in claim 4, wherein the first rotational axis is displaced in relation to the pivotable component and the detent hook is displaced in relation to the first rotational axis against the force of the biasing member.

6. The through load hatch as claimed in claim 3, further comprising a biasing member configured to bias the unlocking lever toward the locked position.

7. The through load hatch as claimed in claim 3, wherein at least the unlocking lever and the detent hook of the lock are formed as a single piece.

8. A vehicle component comprising:

a pin that defines a first rotational axis;

a pivotable component configured to rotate about a second axis of rotation between a resting position and a substantially horizontal loading position; and a lock having a detent hook, the detent hook configured to rotate about the first rotational axis between a locked position in which the detent hook prohibits rotation of the pivotable component and an unlocked position in which the detent hook allows rotation of the pivotable component;

wherein one of the pivotable component and the detent hook being operatively connected to the pin and the other of the pivotable component and the detent hook having an elongated recess;

wherein the pin is configured to slide in the recess between a first position and a second position;

wherein when the pin is configured in the first position, the detent hook is able to pivot between the locked and unlocked positions;

wherein when the pin is configured in the second, the pivotable component prohibits the detent hook from being able to rotate from the locked to the unlocked position to secure the pivotable component in the resting position; and wherein the pin is configured to be moved from the first position to the second position by a force acting on the pivotable component in an opening direction of the pivotable component.

9. The vehicle component as claimed in claim 8, further comprising a biasing member configured to bias the pin toward the first position.

* * * * *